(12) United States Patent
Spirgel et al.

(10) Patent No.: US 8,234,190 B2
(45) Date of Patent: *Jul. 31, 2012

(54) SYSTEMS AND METHODS FOR SECURITIZING A COMMODITY

(75) Inventors: Jonathan S. Spirgel, Great Neck, NY (US); Laura S. Melman, Springfield, NJ (US)

(73) Assignee: The Bank of New York Mellon, New York, NY (US)

( * ) Notice: Subject to any disclaimer, the term of this patent is extended or adjusted under 35 U.S.C. 154(b) by 2169 days.

This patent is subject to a terminal disclaimer.

(21) Appl. No.: 10/680,589

(22) Filed: Oct. 6, 2003

(65) Prior Publication Data

US 2005/0044022 A1 Feb. 24, 2005

Related U.S. Application Data

(60) Provisional application No. 60/415,764, filed on Oct. 4, 2002.

(51) Int. Cl.
*G06Q 40/00* (2012.01)
(52) U.S. Cl. ............ 705/35; 705/38
(58) Field of Classification Search .......... 705/35, 705/38
See application file for complete search history.

(56) References Cited

U.S. PATENT DOCUMENTS

| | | | |
|---|---|---|---|
| 5,671,364 A * | 9/1997 | Turk | 705/39 |
| 6,088,685 A | 7/2000 | Kiron et al. | |
| 6,907,402 B1 | 6/2005 | Khaitan | |
| 6,952,683 B1 | 10/2005 | Gerhard | |
| 7,409,366 B1 * | 8/2008 | Amanat et al. | 705/37 |
| 7,584,137 B2 * | 9/2009 | Pham | 705/37 |
| 2001/0034688 A1 * | 10/2001 | Annunziata | 705/37 |
| 2002/0002532 A1 | 1/2002 | Tso | |
| 2002/0042770 A1 * | 4/2002 | Slyke et al. | 705/37 |
| 2002/0046154 A1 * | 4/2002 | Pritchard | 705/37 |
| 2002/0082903 A1 | 6/2002 | Yasuzawa | |
| 2002/0087454 A1 | 7/2002 | Calo et al. | |
| 2002/0161692 A1 | 10/2002 | Loh | |
| 2003/0149652 A1 * | 8/2003 | Pham | 705/37 |
| 2003/0191708 A1 | 10/2003 | Turk | |
| 2004/0193530 A1 | 9/2004 | Hausman | |
| 2004/0199442 A1 | 10/2004 | Haberle | |
| 2004/0267655 A1 | 12/2004 | Davidowitz et al. | |
| 2005/0033672 A1 | 2/2005 | Lasry et al. | |
| 2005/0038726 A1 | 2/2005 | Salomon | |
| 2005/0044022 A1 | 2/2005 | Spirgel | |

(Continued)

OTHER PUBLICATIONS

Sheryl Jean Journal-Bulletin Business Writer. (Nov. 5, 1989). Silver is a good buy but may be quite risky. Providence Journal,p. F-08. Retrieved Oct. 25, 2010, from Business Dateline. (Document ID: 596861821).*

(Continued)

*Primary Examiner* — Thomas Dixon
*Assistant Examiner* — Benjamin S Fields
(74) *Attorney, Agent, or Firm* — Pillsbury Winthrop Shaw Pittman LLP

(57) ABSTRACT

A commodity trust is provided by a Trustee for a particular commodity. Commodity shares are backed by the Trustee's custody of the actual commodity. For example, commodity shares are created and issued when a trust participant deposits an amount of the commodity with the Trustee or a custodian acting on behalf of the Trustee. After confirmation of the receipt of the commodity, an amount of commodity shares is issued by the Trustee, which is equal in value to the value of the commodity.

19 Claims, 10 Drawing Sheets

U.S. PATENT DOCUMENTS

| | | | |
|---|---|---|---|
| 2005/0171894 A1 | 8/2005 | Traynor | |
| 2005/0192889 A1 | 9/2005 | Sauter | |
| 2006/0111999 A1 | 5/2006 | Spirgel et al. | |
| 2007/0179874 A1 | 8/2007 | Spirgel et al. | |
| 2009/0063366 A1 | 3/2009 | Friedman et al. | |
| 2011/0112951 A1* | 5/2011 | Gould | 705/37 |
| 2011/0258102 A1* | 10/2011 | Blasi | 705/37 |
| 2012/0036059 A1* | 2/2012 | Ionascu et al. | 705/37 |

OTHER PUBLICATIONS

Gold's lustre as investment fades; Analysts hedge their bets on precious metal's future :[Final Edition]. (Oct. 17, 1988). The Gazette,p. B4. Retrieved Oct. 25, 2010, from ProQuest Newsstand. (Document ID: 161270891).*

Calandra, Thom, *New Fund Will Revolutionize Bullion Ownership*, CBS.MarketWatch.com.

Calandra, Thom, *Calandra on Gold*. CBS.MarketWatch.com.

Calandra, Thom, *New NYSE "Paper Gold" Will Spark Investment Demand*. CBS.MarketWatch.com.

Central Gold-Trust IPO Prospectus. Jun. 25, 2003.

Equity Gold Trust Form S-1, May 13, 2003.

IndexFunds.com Staff, *Gold ETF to Test Retail Investor Demand*. Jun. 11, 2003.

kitco.com. re The World Gold Council. http.www.kitco.com/ind/Appel/jun262003.html.

Pandya, Kiran, *Companies Find New Shine to Gold Glitter*. web.midday.com/news/business/2003/july/58479.htm. Jul. 14, 2003.

Pisani, Bob, *Coming Soon: Buy Gold Like a Stock*. http://moneycentral.msn.com/content/CNBCTV/Articles/TV_Reports/P50438.asp.

Radhakrishnan, Sankar, *WGC to Unveil New Ad Campaign*.

*The Gold Equity Share: An Idea Whose Time Has Come*.

"Launch if UK Listed Gold Bullion Securities & New Initiative with World Gold Council" World Gold Council Limited, Dec. 2, 2003.

International Search Report issue in PCT/US06/37701, mailed Sep. 4, 2007, 2 pages.

Written Opinion of the International Searching Authority, mailed Sep. 4, 2007, 3 pages.

* cited by examiner

SYSTEMS AND METHODS FOR SECURITIZING A COMMODITY

RELATED APPLICATION INFORMATION

This application claims benefit under 35 U.S.C. §119(e) to U.S. Provisional Patent Application 60/415,764, entitled "Method and System for Equitizing a Commodity," filed Oct. 4, 2002, which is incorporated herein in its entirety as if set forth in full.

BACKGROUND

1. Field of the Inventions

The present invention relates to exchange-traded equity securities, and particularly to a method and system for securitizing a physical commodity.

2. Background Information

There are many barriers to owning certain commodities that have prevented investors from investing in the commodities, which, in turn, can lead to an undervaluing of the commodities. Gold present a classic example of a commodity that has historically been undervalued because, in part, to the difficulty in storing and transporting physical gold. Currently, a common method for sophisticated investors, e.g., institutional investors and/or their clients, to invest in gold is through the shares of gold producers or in structured notes, e.g., gold linked derivatives, issued by money center financial institutions. For individual retail investors, however, the historical barriers have been even more daunting. For example, a common practice for the individual investor wishing to own gold is to buy gold coins or jewelry. The downside to this approach is that the investor must then find a way to store and secure the gold that they own, which can be costly. Moreover, such an investor will likely have to take out insurance in case the gold is stolen or lost, which adds further costs to owning gold for the individual investor.

Thus, liquidity in the gold market has been restricted, leading to under valuation, because of the difficulty and costs associated with transporting and storing the physical gold. While some may be willing to take on the burden and risk of owning the physical metal, many mainstream investors consider investment in physical gold to be prohibitive. Rather, many such investors prefer to invest in the shares of generic, highly liquid gold mining companies.

Although gold mining shares appeal to those seeking their considerable leverage to changes in the gold price, they incorporate business risks that clash with the fundamentally conservative and risk adverse reasoning that might attract a wider audience to gold. This is because the business of mining gold can be subject to various uncertainties, including geological, labor, regulatory and environmental, financial, and political risks. Conversely, ownership of the physical metal does not exhibit such risks. The same cannot be said for the gold linked structured notes, or derivatives, issued by financial institutions such as money center banks or investment houses. These instruments are backed not by gold but by the credit of the issuing institution. They are often easy to buy and next to impossible to sell.

Accordingly, there is no existing mechanism that facilitates trading in gold, or certain other commodities, in such a way as to overcome the historical barriers that have led to under valuation.

SUMMARY OF THE INVENTION

The present invention comprises systems and methods for securitizing a commodity. According to an aspect of the present invention, it comprises a commodity trust or other special-purpose vehicle (hereafter collectively referred to as a "Trust") that is established to hold a particular commodity and to issue commodity shares and/or receipts corresponding to the value of the commodity held by the Trust. The commodity shares may represent a proportional interest in the Trust and/or the commodity held by the trust. The Trust may include one or more Trust accounts to receive and store the commodity deposited with the Trust.

The Trust can be administered by a "Trustee" (i.e., a trustee, administrator, issuing agent, or the like) that among other things, receives and stores the commodity in the Trust account(s) for and on behalf of participants of the Trust (i.e., authorized depositors), issues commodity shares to each participant corresponding to the value of the commodity being stored on their behalf and administers the Trust on a day-to-day basis by, for example, keeping record of Trust expenses and periodically determining the net asset value of the commodity shares. Holders of the commodity shares may redeem them to receive actual units of the commodity stored in the Trust account.

According to one embodiment, the Trustee may appoint one or more custodians or sub-custodians to maintain and administer the Trust account(s) for and on behalf of the Trustee. Such a custodian or sub-custodian may be a recognized and/or authorized depository for the particular commodity in question. Alternatively, the custodians/sub-custodians may be appointed by the sponsor of the Trust, the issuer of the commodity shares and/or any other entity recognized as the offeror or registrant of the commodity shares.

The commodity shares can be traded on a major securities exchange such as the New York Stock Exchange (NYSE), the American Stock Exchange (AMEX), the National Association of Securities Dealers Automatic Quotation System (NASDAQ), or any other exchange or Electronic Communication Network (ECN), thereby creating a robust secondary market for the commodity shares.

One object of the present invention is to provide a more convenient and cost-effective method for investing in a commodity relative to traditional methods.

Another object of the present invention is to encourage greater investor participation in the market for commodities.

Another object of the present invention is to overcome certain barriers-to-entry traditionally associated with investing in commodities.

Another object of the present invention is to help investors avoid certain costs traditionally associated with purchasing, storing and insuring a commodity.

Another object of the present invention is to provide an efficient means to implement various investment strategies involving commodities.

Another object of the present invention is to provide investors with convenient access to the market for a particular commodity via an exchange-traded security.

Another object of the present invention is to provide investors with an exchange-traded security whose performance generally corresponds to the price of a particular commodity.

These and other features, aspects, objects and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

While some of the embodiments below are described in relation to the securitization of gold, it will be understood that the systems and methods described herein can apply equally to other types of commodities. Other commodities can include, for example, silver, platinum, palladium, ferrous and base metals, oil and gas products, energy and industrial minerals, foreign currencies, and soft commodities such as sugar or grains, to name just a few. Thus, the following descriptions should not be seen to limit the system and methods described herein to any particular type of commodity.

Figure 1:
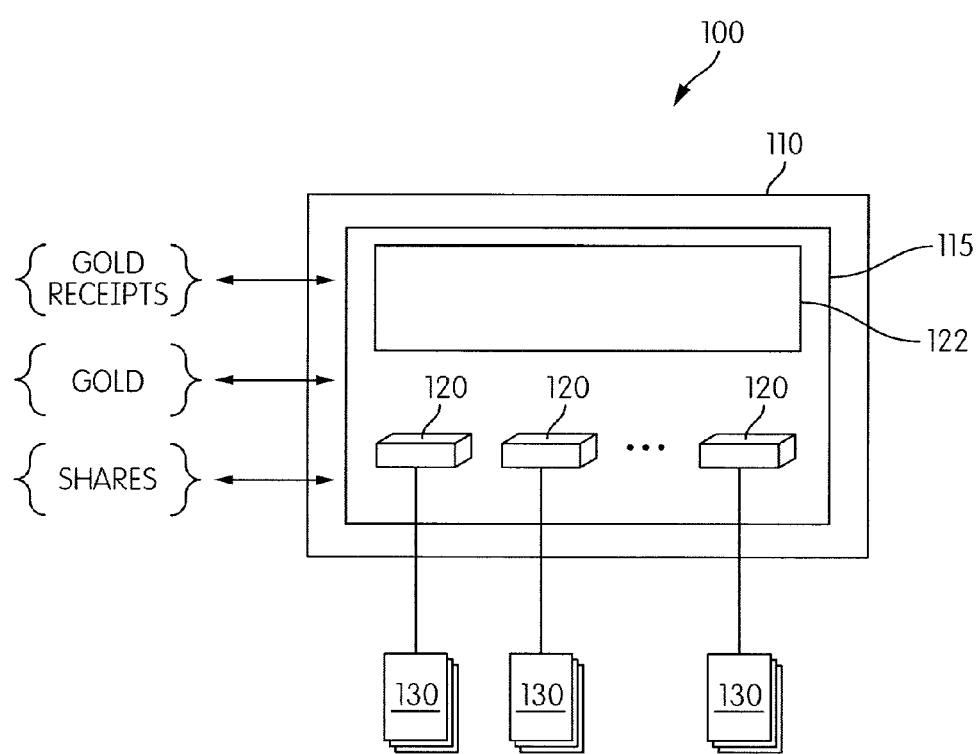
FIG. 1 is a diagram illustrating a gold trust in accordance with one embodiment.

FIG. 1 illustrates a gold Trust 100 according to an embodiment of the present invention. Particularly, gold Trust 100 comprises a Trustee 110, a gold Trust account 115, a number (N) of gold units 120, and a number of equity shares 130 representing an interest in gold trust 100. According to one embodiment, Trustee 110 serves as both the administrator of the gold Trust 100 and custodian of the gold Trust account 115. According to another embodiment, Trustee serves as the administrator of the gold Trust 100 while a separate entity is appointed act as custodian for the gold Trust accounts. Assets held by the gold Trust 100 include Gold units 120, which can include gold bullion such as Commodity Exchange, Inc. (COMEX) gold bars and/or London Good Delivery gold bars that are individually identified and tracked, and/or gold receipts 122 representing an interest in an unallocated amount of physical gold. According to yet another embodiment, gold Trust 100 may also hold an amount of cash from fees collected, the proceeds of cash market transactions and the like. Cash held in gold Trust account 100 can, in certain embodiments, be invested, e.g., in time deposits, overnight accounts, money market, funds, etc. Gold Trust 100 may also accrue interest and/or dividends and Trustee 110 may remit dividends and/or other distributions to participants in gold Trust 100.

Equity shares 130 can be issued by Trustee 110 for a value corresponding to an amount of gold units 120 held by the gold Trust in the gold Trust account 115. For example, one equity share 130 can correspond to one gold unit 120, to a fractional interest in one gold unit, or to a fractional interest in a unit weight of gold as needed to make the equity shares affordable and attractive to potential investors. In one embodiment, one equity share 130 corresponds to $1/10^{th}$ of a fine troy ounce of gold bullion, thereby making the cost of each equity share 130 approximately equal to $1/10^{th}$ of the spot price of an ounce of gold.

In operation, participants in gold Trust 100 can obtain new shares 130 of gold Trust 100 by depositing physical gold units 120 into gold Trust account 115 in exchange for a number of shares 130 of corresponding value. Participants can also redeem shares 130 of the gold Trust 100 by transferring its shares 130 to Trustee 110 and receiving a corresponding amount of gold units 120 in return. It should also be noted that in certain embodiments, gold receipts representing unallocated physical gold can also be deposited and/or redeemed, either to make up for the difference between an amount of gold units 120 being deposited or returned and the value of the shares 130 being created or redeemed as explained below, or in place of the actual deposit and transfer of physical gold units 120.

The participants may include gold investors, gold manufactures, gold distributors, and the like. However, because gold is relatively expensive to move and store, it is not cost-effective to do so in small amounts. Therefore, according to one embodiment, only certain participants are authorized to create and redeem shares 130 of gold Trust 100. According to one embodiment, an authorized participant must be a registered broker-dealer or other securities market participant who is also a participant in the Depository Trust Company (DTC), which acts as the security depository for shares 130. In another embodiment, however, anyone can create shares 130 as long as they give Trustee 110 instructions as to which, e.g., DTC account is to be used.

Furthermore, a limit can be imposed on the number of shares that can be redeemed and/or created at a given time. For example, in one embodiment, the gold Trust will only create and/or redeem shares 130 in baskets of 100,000 shares at a time. An authorized participant can create baskets of shares and subsequently make the shares 130 available in smaller amounts to regular investors in the secondary market. Alternatively, the Trustee 110 may limit requests to create and/or redeem shares 130 to only those that are at or above a specified minimum value. For example, in one embodiment, the Trustee 110 will not create shares 130 for a request that is below a minimum value of approximately $400,000.

In another embodiment, anyone can redeem shares as long as they redeem through and authorized participant, e.g., a participant with a DTC account. In such an embodiment, a minimum number of shares 130 to be redeemed can still apply, but this minimum may be set at a lower threshold in order to appeal, for example, to retail customers. In on embodiment, for example, a minimum threshold on the range of 40-80 shares 130 can be used. A transaction fee may still apply as with other redemption transactions described herein.

In certain embodiments, gold Trust account 115 can also include a certain amount of gold receipts 122. Gold receipts 122 may be used to represent amounts of unallocated gold that can then be used in conjunction with the creation and redemption of shares 130. For example, upon creation or redemption of shares 130 a relatively small amount of gold receipts, representing unallocated gold 122, can be deposited with, or withdrawn from, gold Trust account 115. The use of the gold receipts can be required due to the fact that the gold bullion delivered to, or withdrawn from, gold Trust account 115 can vary slightly from unit to unit. Thus, it is not always possible to deliver the exact amount of gold bullion being created or redeemed.

For example, "COMEX deliverable" bars are of a size and weight standard to the COMEX gold futures market—approximately 100 troy ounces per bar, at a minimum of 0.995 fineness. Thus, COMEX deliverable gold bars typically vary in both weight and gold fineness. A "100 troy ounce" COMEX deliverable bar can actually vary from 95 ounces to 105 ounces, and will also vary from 0.9950 fineness of gold to 0.9999 fineness. Because of, this variation, each bar's actual gold ounces, i.e., weight of pure gold, is based on the concept of "net fineness," or ounces multiplied by fineness. The following two examples demonstrate the concept of "net fineness:"

Example one: a COMEX deliverable gold bar is 95 ounces and 0.9950 fineness. Calculate actual gold ounces in this bar based on the concept of net fineness: 95 ounces×0.9950 fineness=94.525 actual ounces.

Example Two: a COMEX deliverable gold bar is 104 ounces and 0.9999 fineness. Calculate actual gold ounces in this bar: 104 ounces×0.9999 fineness=103.9896 actual ounces.

Similarly, London Gold Delivery standard gold bars are 350-430 fine troy ounces at a 0.995 minimum fineness. Thus, upon creation, a participant is not necessarily able to deliver the exact amount of ounces in gold bar form due to the variation in weight and fineness of gold bars. Likewise, Trustee 110 is not necessarily able to deliver an exact amount of gold ounces in gold bar form to a participant upon redemption. The amount of gold delivered for a creation or redemption can be calculated, however, according to net fineness, with any difference between the creation and redemption ounces required and the actual gold delivered in bar form paid in gold receipts 122 for unallocated gold.

Gold receipts 122 can be traded in small increments, down to 1/20th of an ounce, for example. In one embodiment, gold bars 120 delivered for a creation comprise ounces of gold up to but not over the amount required, with the shortfall made up by the delivery of gold receipts 122 from a participant. Upon redemption, Trustee 110 can deliver to a participant up to but not over the amount of gold ounces required in bar form, with the shortfall made up by Trustee 110 delivering gold receipts 122 to the participant. In another embodiment of the present invention, cash can be provided instead of gold receipts 122 to make up the difference between the creation and redemption ounces required and the actual gold delivered to or by the Trust 100.

It should be noted that the unallocated gold can be maintained by a bank or a bullion dealer as part of a general pool of gold. Trading in unallocated gold receipts often occurs among gold traders. Depending on the embodiment, trades in unallocated gold receipts can take place by paper transfers between unallocated gold accounts. For example, in one embodiment, trades can be cleared through book entry transfers in or out of unallocated gold accounts at one or more clearing firms. The clearing firms can then clear their net trades with one another through physical gold bullion for unallocated gold on demand.

Thus, in one embodiment, when Trustee 110 receives gold receipts, individual gold units 120 are not assigned to gold trust 115. Similarly, when Trustee 110 delivers gold receipts, no corresponding gold units 120 are delivered; however, depending on the embodiment, unallocated gold 122 can be transferable to allocated gold, i.e., to gold units 120 in gold trust 115, on demand.

According to one embodiment, Trustee 110 is not the custodian of gold Trust account 115. Instead, custody of gold Trust account 115 may be delegated to one or more custodians and sub-custodians who actually receive and store the gold units 120 for Trustee 110. Trustee 110 may appoint such a custodian/sub-custodian if, for example, Trustee 110 does not have a significant gold storage capacity or Trustee 110 is not a qualified depository for gold units 120. Moreover, at the direction of Trustee 110, the custodian/sub-custodian can take delivery of and distribute gold 120 directly from/to the participants. Detailed inventory of the gold Trust account 115, including the net fineness of each bar held in the gold Trust account 115, can be provided periodically, or non-periodically to Trustee 110 from the custodian/sub-custodian. For example, the detailed inventory may be provided nightly, weekly, etc. If Trustee does have some capacity to receive and store gold, custody of the gold can be shared among Trustee 110 and one or more custodians and sub-custodians. For purposes of this application, custodian and sub-custodian shall hereafter be referred to collectively as "Custodian."

Figure 2:
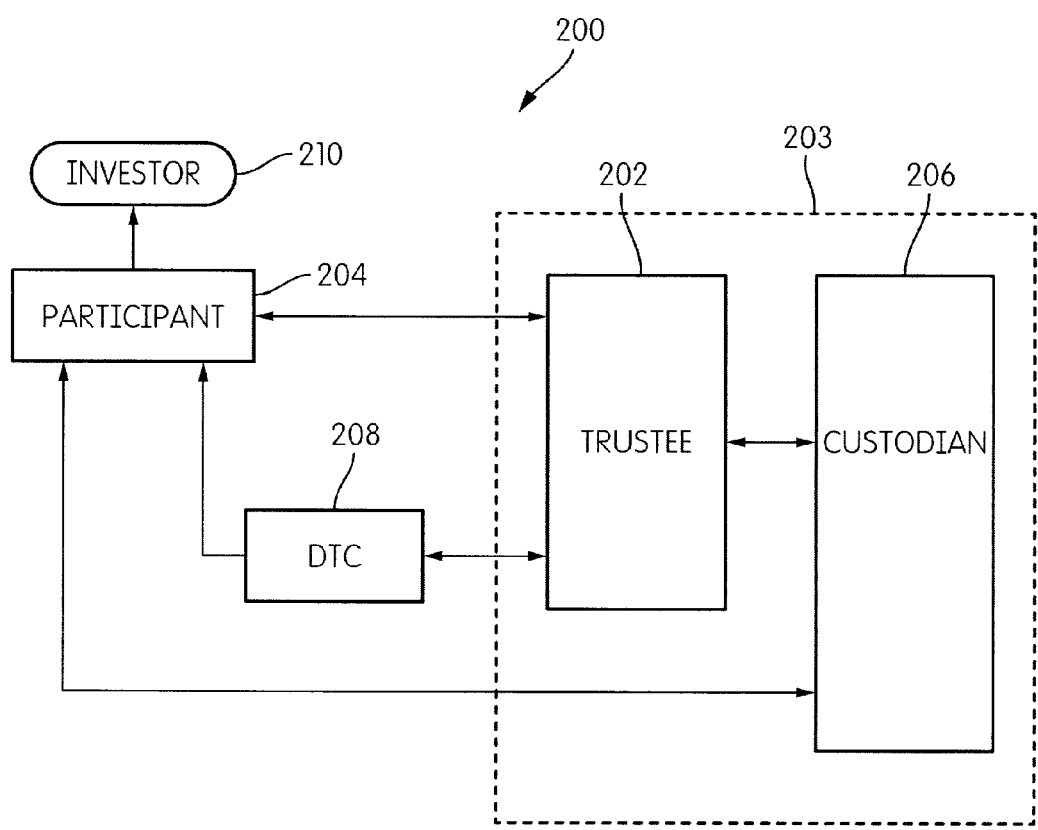
FIG. 2 is a diagram illustrating a gold trust system comprising a custodian in accordance with another embodiment of the invention.

FIG. 2 is a diagram of a gold trust system 200 including a Custodian 206 in accordance with one embodiment of the invention. In addition to Custodian 206, gold trust system 200 comprises Trustee 202, participant 204 and gold Trust 203. According to one embodiment, participant 204 is a registered broker-dealer or other securities market participant who is also a participant in the DTC 208. After Trustee 202 has issued a basket of shares to participant 204, the shares can be made available to other investors 210 via a securities exchange.

In general, the process of creating gold shares 130 may be as follows according to one embodiment of the invention: Participant 204 sends a creation order to Trustee 202, which may include a request to create a specified number of shares 130 or to create a number of shares corresponding to a specified amount of gold. Trustee 202 may respond to the creation order with an acknowledgement, which acknowledgement may include instructions to the participant 204 on how to deliver the gold units 120 to the gold Trust account 115 and in what amounts. Trustee 202 may also notify the Custodian 206 of the pending delivery of gold units 120 to gold Trust account 115. Custodian 206 notifies Trustee 202 when the required amount of gold units 120 have been deposited into the gold Trust account 115 by participant 204. Trustee 202 then instructs DTC 208 to create and release a corresponding number of shares 130 to participant 204.

Figure 3:
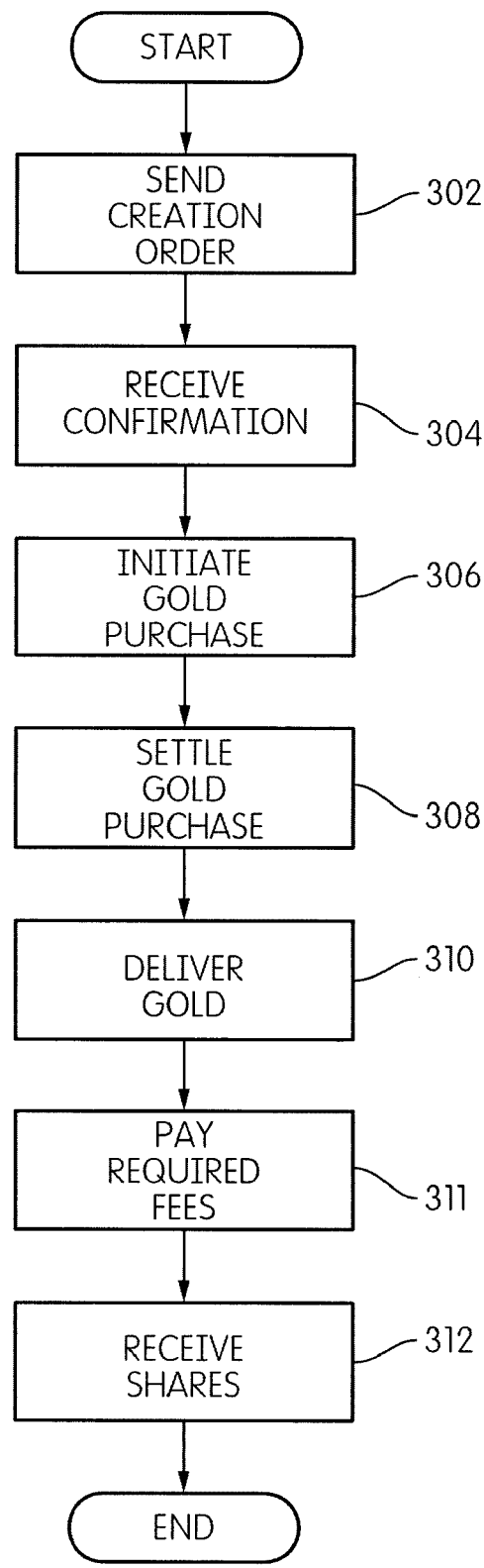
FIG. 3 is a flow chart illustrating a method for creating shares within the system of figure two from the perspective of a participant in accordance with one embodiment of the invention.

FIG. 3 is a flow chart depicting an exemplary process for creating shares 130 from the viewpoint of participant 204 according to one embodiment of the invention. In step 302, participant 204 sends a creation order to Trustee 202. The creation order may indicate the amount of shares requested, the number of baskets of shares requested and/or the amount of gold units 120 to be deposited.

It should be noted that there often will be costs associated with maintaining Trust 203. Thus, the actual value of a gold share 130 can be equal to the value of the associated amount of gold units 120 minus an allocated portion of any costs associated with maintaining Trust 203 and/or with the creation or redemption of shares 130.

In step 304, participant 204 may receive a notice from Trustee 202 confirming receipt of the creation order.

In step 306, participant 204 may initiate a purchase of gold sufficient to cover the requested shares 130. For example, if participant 204 has requested the creation of one basket of shares 130 corresponding to 10,000 ounces of gold, then participant 204 may initiate the purchase of 10,000 ounces of gold in step 306. In step 308, participant 204 can settle the gold purchase and deliver the purchased gold to the gold Trust account 115 in step 310. Participant 204 may also tender cash or gold receipts 122 to the gold Trust account 115 to make up for any shortfall between the actual amount of gold delivered in step 310 and the amount required to cover the requested shares 130. In exchange for the delivered gold, and gold receipts or cash, as the case may be, participant 204 receives gold shares 130 in step 312.

Participant 204 can purchase gold in various ways. For example, participant 204 can purchase futures and convert the gold futures into gold units 120 in what is conventionally referred to as an "Exchange For Physical" (EFP) transaction. In such transactions, participant 204 often maintains a custodial account with at least one of the existing gold depositories for the COMEX, e.g., HSBC, ScotiaMocatta, and Brinks. Furthermore, assuming that the gold Trust account 115 is also held by one of the depositories (i.e., the Custodian is also a COMEX depository) participant 204 can request that the COMEX gold depository transfer gold from the participant's depository account to gold Trust account 115.

Currently, the COMEX depositories hold gold accounts for broker/dealers that buy and sell gold bullion. These depositories do not charge for a depository-to-depository transfer of gold. Because participant 204 may be required to pay all costs associated with delivery of gold into and out of the gold Trust account 115, delivery of gold via EFP transactions on the COMEX can be relatively cost efficient. Purchasing gold via EFP transactions on the COMEX also ensures that the gold is at least of a minimum required quality for Trust 203. The same is true when LBMA gold is used. Clearing time of gold from a COMEX or LBMA depository to the gold Trust account 115 can be one day, assuming Custodian 206 is a also a depository bank of the COMEX or LBMA, as the case may be.

Alternatively, participant 204 may purchase gold units 120 in a cash market transaction by simply buying the required amount of gold units 120 from a bullion dealer on the open market, or from the Custodian 206. The bullion dealer can deliver the purchased gold units 120 to the gold Trust account 115. In such a cash market transaction, the gold may also be weighed and assayed for standard weight and fineness. Because participant 204 may be required to pay all costs associated with weighing, assaying and delivering the gold into and out of the gold Trust account 115, creation of shares through a cash market transaction has potentially high costs for participant 204.

Figure 4:
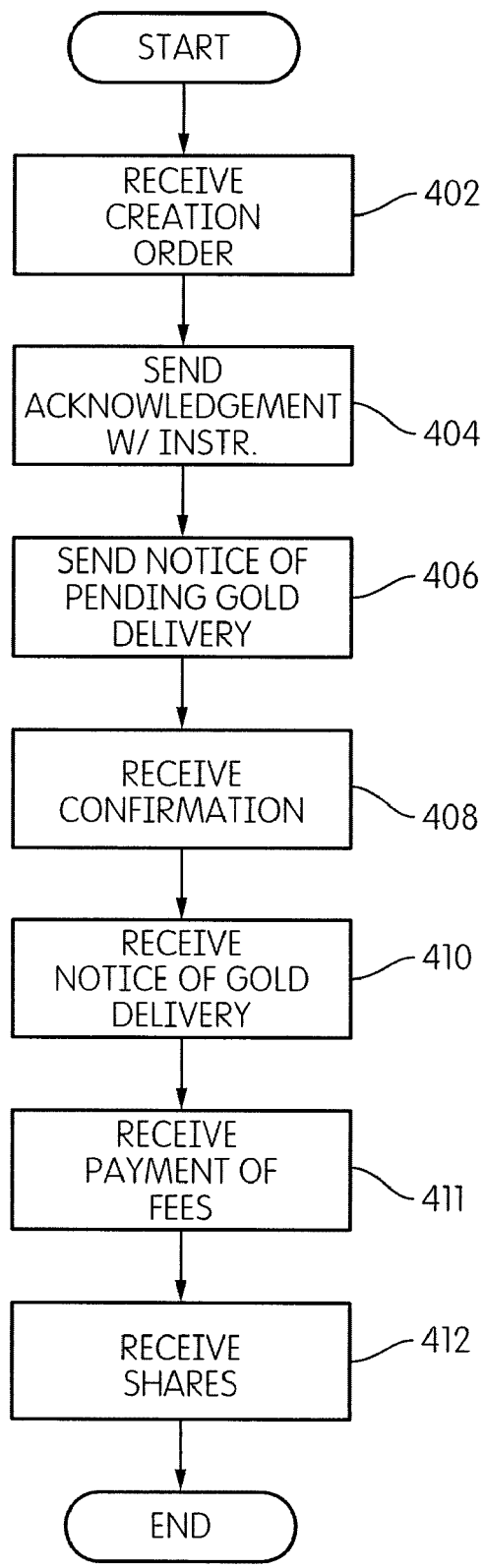
FIG. 4 is a flow chart illustrating a method for creating shares within the system of figure two from the perspective of a Trustee in accordance with one embodiment of the invention.

FIG. 4 is a diagram illustrating an exemplary method for creating shares 130 from the perspective of Trustee 202 in accordance with one embodiment of the invention. In step 402, Trustee receives a creation order from participant 204. In step 204, Trustee 202 may generate and send an acknowledgement to participant 204 confirming receipt of the creation order. The acknowledgement may include instructions on how to deliver the gold to Trust account 115.

Trustee 202 may send a notice of pending gold delivery to Custodian 206, which notice may include, for example, an amount of gold units 120 to be delivered and an identity of participant 204. In step 408, Trustee 202 may receive a notice from Custodian 206 confirming receipt of the notice of pending gold delivery.

In step 410, Trustee 202 may receive confirmation from Custodian 206 that gold units 120 have been deposited in Trust account 115. In a step 411, Trustee may also receive payment of any required fees, e.g., transactions fees to cover costs and expenses of the Trust 203, which fees may be paid by the participant 204 or from the assets held in Trust account 115, for example. In a step 412, Trustee may cause an amount of shares 130 corresponding to the amount of gold deposited to be created and released to participant 204. In one embodiment of the invention, the shares are created and released to participant 204 through DTC 208. In an alternative embodiment, Custodian 206 may initiate the release of shares 130 instead of Trustee 202.

Figure 5:
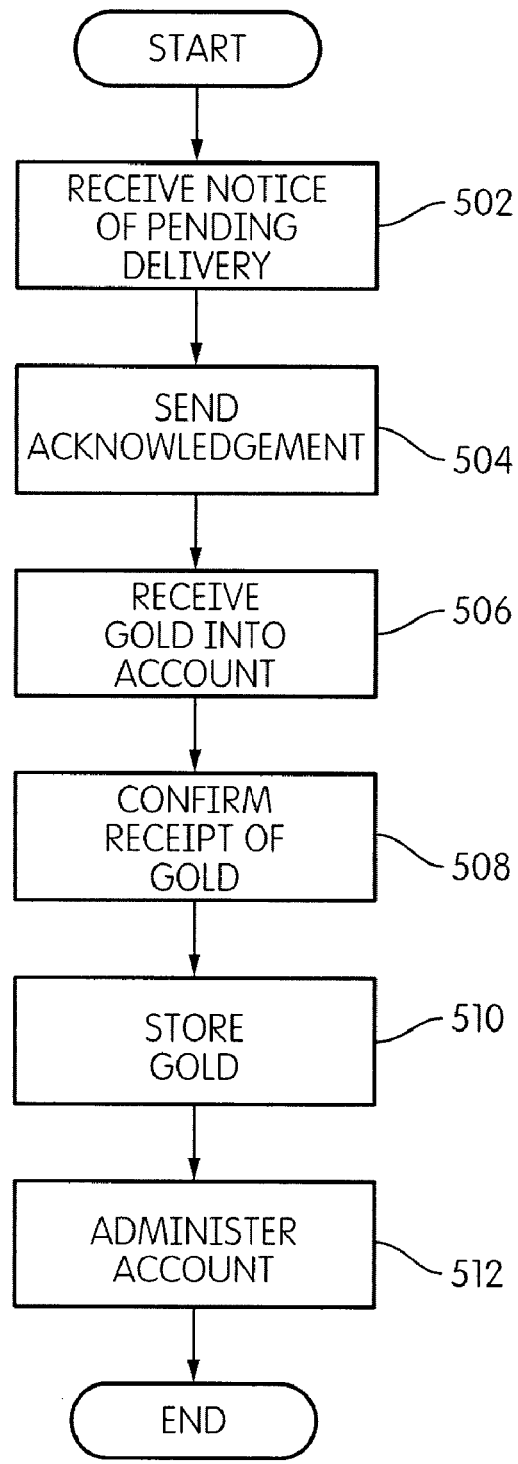
FIG. 5 is a flow chart illustrating a method for creating shares within the system of figure two from the perspective of a custodian in accordance with one embodiment of the invention.

FIG. 5 is a flow chart illustrating an exemplary method for creation of shares 130 from the perspective of a Custodian 206 in accordance with one embodiment of the invention. In step 502, Custodian 206 may receive a notice of pending gold delivery from Trustee 202, which notice may include, for example, an amount of gold units 120 to be delivered and an identity of participant 204. In step 504, Custodian 504 may send an acknowledgement to Trustee 202 confirming receipt of the notice of pending gold delivery.

In step 506, Custodian 206 receives the physical gold and, in step 508, may send a notice to Trustee 202 confirming that the gold was received in gold Trust account 115 in the appropriate amounts.

Custodian 206 stores the gold in gold Trust account 115 in step 510 and administers the gold Trust account 115 in a step 512. Among other things, Custodian 206 may periodically generate and issue reports to Trustee 202 indicating the amount and quality of gold held in gold Trust account 115 and showing activity in the account over a specified period.

In general, the process of redeeming gold shares 130 may be as follows according to an embodiment of the present invention: Participant 204 sends a redemption order to Trustee 202. Trustee 202 may instruct participant 204 to tender the shares to Trustee's DTC account. Trustee 202 confirms that the shares have been transferred into the Trustee's DTC account. Thereafter, Trustee 202 tenders a corresponding amount of gold to participant 204 by, for example, instructing Custodian 206 to transfer gold in Trust account 115 to an account associated with participant 204 and receiving confirmation from Custodian 206 that the transfer is complete.

Figure 6:
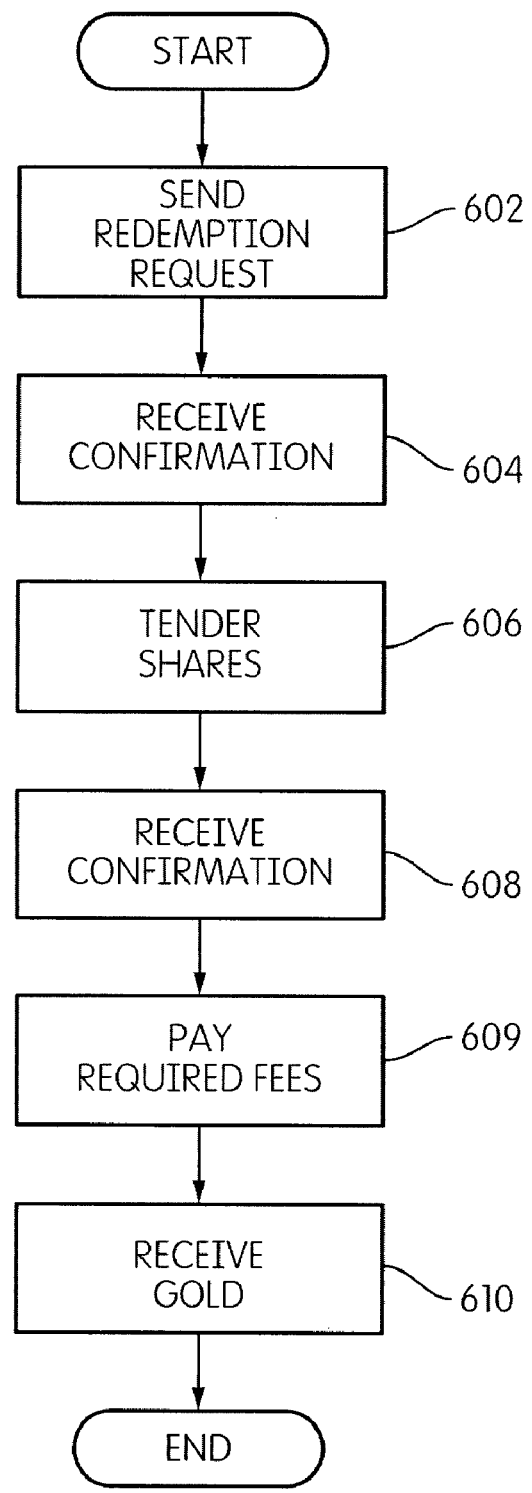
FIG. 6 is a flow chart illustrating a method for redeeming shares within the system of figure two from the perspective of a participant in accordance with one embodiment of the invention.

FIG. 6 is a flow chart illustrating an exemplary method for redeeming shares 130 from the perspective of participant 204 in accordance with one embodiment of the invention. In step 602, participant 204 may send a redemption order to Trustee 202. The redemption order may indicate the number of shares 130, or baskets of shares, being redeemed.

In step 604, participant 204 may receive a notice from Trustee 202 confirming receipt of the redemption order. In step 606, participant 204 delivers the shares being redeemed by, for example, transferring the shares from its DTC account to the Trustee's DTC account. In step 610, participant 204 receives an amount of gold units 120 corresponding to the number of shares 130 being redeemed. A certain amount of cash or gold receipts 122 may also be delivered, or transferred to an account associated with participant 204 to make up for any difference between the actual amount of gold units delivered in step 610 and the amount of gold required to cover the redeemed shares. Alternatively, if the amount of gold delivered exceeds the requisite amount based on the redeemed shares, then participant 204 can be required to deliver a certain amount of cash or gold receipts 122 to account for the excess.

Figure 7:
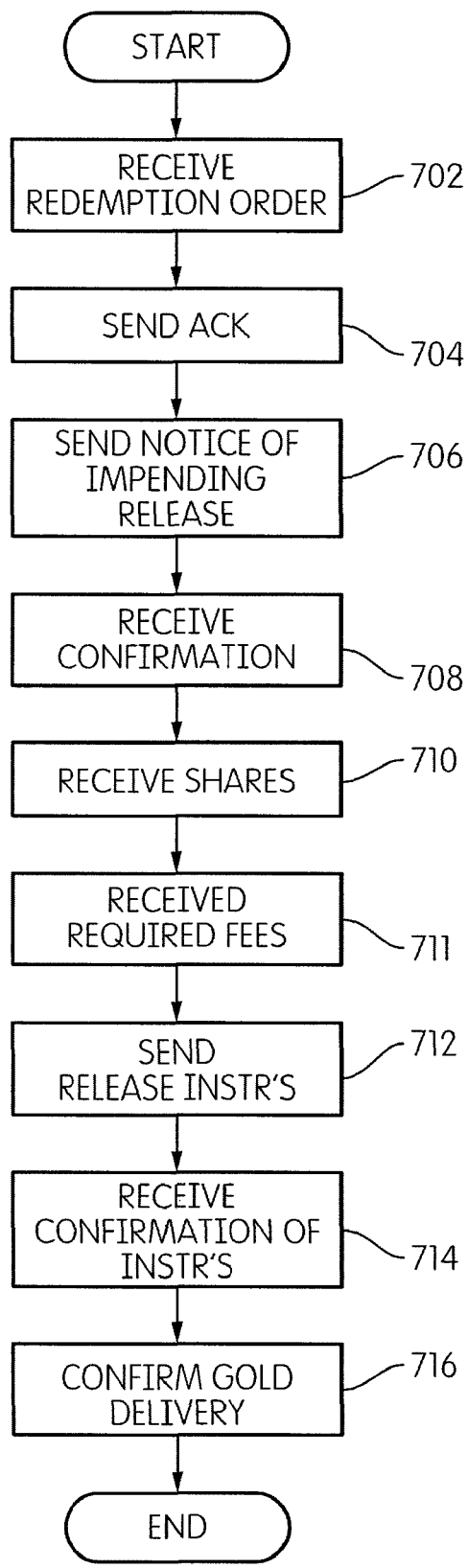
FIG. 7 is a flow chart illustrating a method for redeeming shares within the system of figure two from the perspective of a Trustee in accordance with one embodiment of the invention.

FIG. 7 is a flow chart illustrating an exemplary process for redeeming gold shares 130 from the perspective of Trustee 202 according to one embodiment of the invention. In step 702, Trustee 202 receives a redemption order from participant 204 and sends an acknowledgement in step 704 confirming receipt of the same. The redemption order may indicate the amount of gold shares being redeemed and the identity of participant 204. In step 706, Trustee 202 may send a notice of impending release to Custodian 206. The notice of impending release may including provisional instructions directing the Custodian 206 to release and transfer a specified amount of gold units 120 to an account associated with participant 204. In step 708, Trustee 202 may receive a notice from Custodian 206 confirming receipt of the notice of impending release.

In step 710, Trustee 202 receives the shares 130 being redeemed from participant 204. For example, according to one embodiment, the shares are delivered via DTC 208 and Trustee 202 receives a notice from its DTC agent confirming receipt of the shares. In a step 711, Trustee 202 may also receive payment of any required fees, e.g., transaction fees to cover costs and expenses of the Trust incurred in connection with the redemption order, which fees may be paid by the participant 204 or from the assets held in Trust account 115, for example. In step 712, Trustee 202 delivers a corresponding amount gold to participant 204 by, for example, sending release instructions to the Custodian 206 directing Custodian 206 to release and deliver the gold to an account associated with the participant 204, i.e., directing Custodian 206 to execute the provisional instructions included in the earlier notice of impending release. In a step 714, Trustee 202 may receive a notice from Custodian 206 confirming receipt of the release instructions. In step 716, Trustee 202 may receive confirmation from Custodian 206 that the gold units 120 where delivered to the participant 204.

Figure 8:
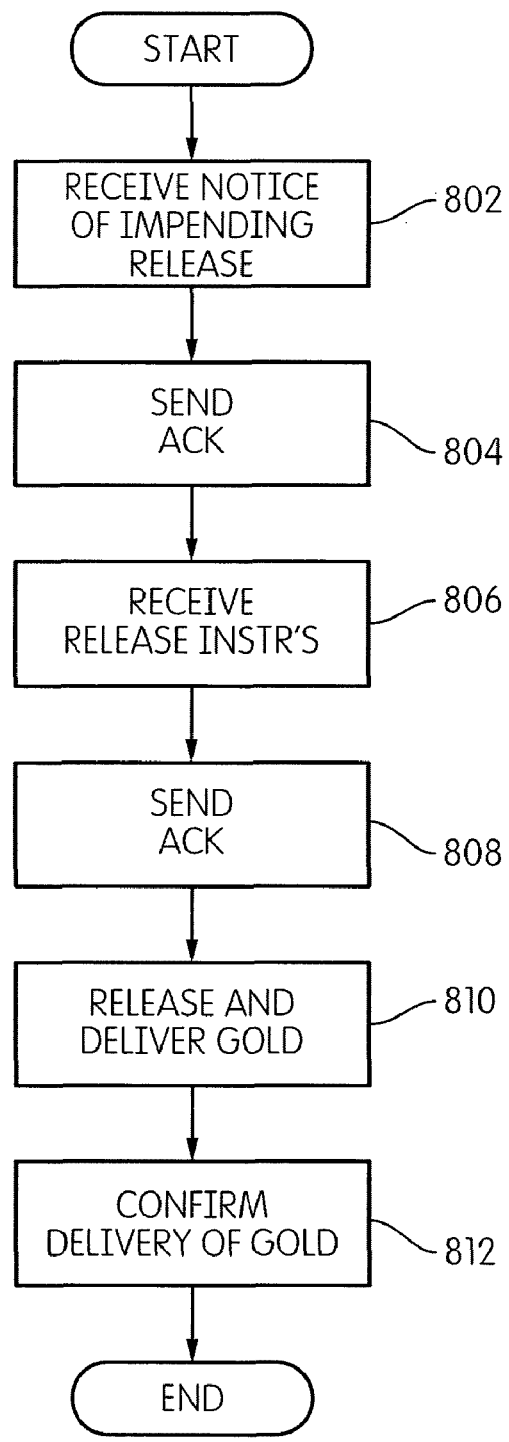
FIG. 8 is a flow chart illustrating a method for redeeming shares within the system of figure two from the perspective of a custodian in accordance with one embodiment of the invention.

FIG. 8 is a flow chart illustrating an exemplary method for redeeming shares 130 from the perspective of Custodian 206 in accordance with one embodiment of the invention. In step 802, Custodian 206 may receive a notice of impending release from Trustee 202, which notice may include provisional instructions directing the Custodian 206 to release and deliver a specified amount of gold units 120 to an account associated with an identified participant. In step 804, Custodian 206 may send an acknowledgement to Trustee 202 confirming receipt of the notice of impending release instructions. In step 806, Custodian 206 may receive release instructions from Trustee 202 directing Custodian 206 to release and deliver a specified amount of gold units 120 to an account associated with an identified participant, i.e., directing Custodian 206 to execute the provisional release instructions included in the earlier notice. In a step 808, Custodian 206 may send a notice to Trustee 202 confirming receipt of the release instructions and, in step 810, Custodian 206 delivers a specified amount of gold units 120 to an account associated with the participant 204. In step 812, Custodian 206 may send notice to Trustee 202 confirming that the delivery is complete.

According to an embodiment of the present invention, gold Trust account 115 may comprise an allocated gold Trust account and an unallocated gold Trust account. An allocated gold Trust account is a gold account maintained in the name of the account holder (e.g., the Trustee 202) in which gold is received and held on an "allocated basis" for the account holder, i.e., the Trustee 202 has title to specific gold units 120 (e.g., gold bars or coins) held in the account. Each of gold units 120 held in the allocated gold Trust account are individually identified by any or all of the following: serial number, refiner, assay and gross and fine weight. An unallocated gold Trust account is a gold account maintained in the name of the account holder (e.g., the Trustee 202) in which gold is received and held on a "unallocated basis" for the account holder, i.e., the Trustee 202 has no interest in specific gold units 120 held in the account. Instead, the account holder is entitled to an unsegmented fine weight amount of the Custodian's 206 general inventory of gold (perhaps of a particular type or fineness) standing to the credit of the Trust.

According to an embodiment of the present invention, all transfers of gold into and out of Trust 203 in connection with the creation and redemption of shares may be done through credits and debits to the unallocated gold Trust account as follows: Upon creation of shares 130, gold may be transferred into Trust 203 by crediting a fine weight amount of gold deposited by the participant 204 to the unallocated gold Trust account. Thereafter, the Custodian 206 transfers the deposited amount of gold from the unallocated gold Trust account to the allocated gold Trust account by transferring specific gold units 120 held in Custodian's general inventory into the allocated gold Trust account corresponding to the fine weight amount of gold deposited in the unallocated gold Trust account (to the extent that the deposited fine weight amount can be represented by whole gold units 120). Because the deposited gold amount is allocated in multiples of whole gold units only, the amount of gold allocated from the unallocated gold Trust account to the allocated gold Trust account may be less than the total fine weight amount deposited by the participant. The balance may continue to be held in the unallocated gold Trust account.

The process of transferring gold out of Trust 203 in connection with a redemption of shares may follow the same general procedure described above in reference to creation of shares, only in reverse.

It should be noted that shares 130 can represent an equity interest in trust 115. Thus, each share would represent a proportionate interest in trust 115 and the value of each share 130 should track the proportionate value of trust 115. Alternative, however, shares 130 can represent some other form of redeemable "marker" that represents a proportionate interest in trust 115. For example, each share 130 can actually be a debt instrument or a hybrid equity/debt instrument. In other words, participant 204 can be seen as loaning a certain amount of gold units 120 to trust 115. In return for the gold units 120 loaned to trust 115, Trustee 202 can cause a certain amount of notes 130 to be delivered to participant 204. Each note can, for example, represent one ounce of gold. Notes 130 can still be created in baskets, e.g., of 100,000 notes, and the value of each note 130 can still be approximately equal to the proportionate value of trust 115. Thus, the inventions described here in, and specifically the term "share(s)" should be seen as covering any type of exchange-traded security.

The creation process would then involve creating notes that can still be traded on a secondary market and redeemed for the associated amount of gold units 120. Thus, it will be understood that the systems and methods described herein are not dependant on whether shares 130 represent equity or debt instruments.

It should be noted that gold receipts may actually be the redeemable marker, e.g., in embodiments where gold receipts are created and redeemed as opposed to the physical gold as described above.

It should also be noted that the role of custodian can also be performed by Trustee 202. In other words, if Trustee 202 has the capability, then Trustee 202 can receive, store and deliver gold as required.

In one embodiment, the minimum amount of purchase or redemption for a primary market, i.e., the market consisting of participants 204, correlates with the gold futures market, to facilitate purchase of shares and improve liquidity, transparency, and hedging alternatives. No minimum purchase or redemption amounts, however, need apply to the secondary market, except for any existing exchange minimums.

Trust 100 can thus provide benefits to both the institutional and retail markets by providing a liquid security the performance of which correlates with the performance of gold bullion, or some other commodity. In addition, significant hedging of trust shares 130 with, e.g., the gold futures market, such as on the COMEX, can also be facilitated. As is often the case with ETFs, liquidity and hedging alternatives work to keep spreads tight between the bid and ask on trust shares 130, which can also be beneficial.

In another embodiment, participant may elect to deliver or receive cash instead of delivering or receiving gold units 120 to/from the Trust 203. In the case of a creation order, participant may elect to deliver cash to the trust corresponding to the amount of gold that is required to create the requested shares 130. Thereafter, Trustee 202 may use the cash to buy the required gold on the spot market. The purchased gold is then deposited in the Trust account 115 and the shares 130 are delivered to the participant as described above in reference to the process for creating shares 130. In the case of a redemption order, the participant may elect to receive cash value for the gold corresponding to the tendered shares 130. In that event, Trustee may withdraw the gold from the Trust account 115, sell the gold on the open market and give the proceeds to participant 204. In each case, if Trustee 202 is not a qualified broker/dealer for gold, then Trustee 202 may engage a qualified broker/dealer to perform the buy/sell transactions described herein.

Figure 9:
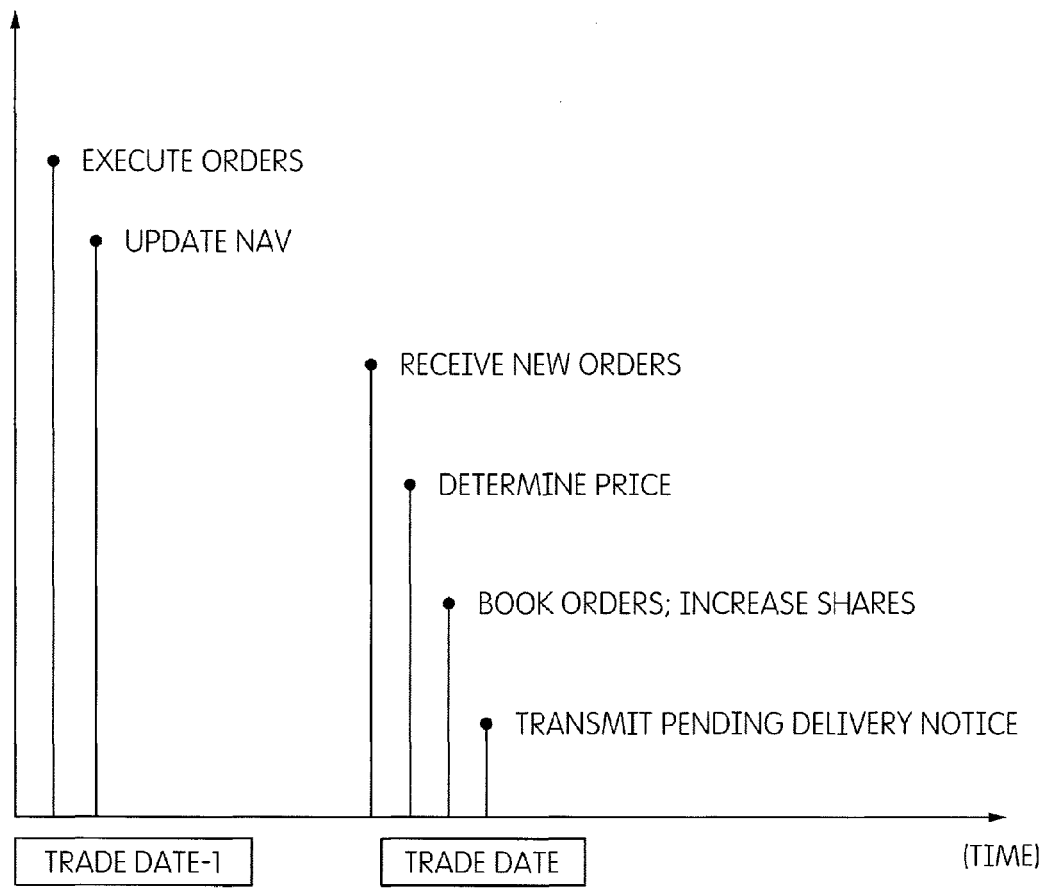
FIG. 9 is a time line illustrating the steps performed by a Trustee leading up to a trade date with respect to a creation or redemption transaction in accordance with one embodiment.

FIG. 9 is a timeline illustrating when certain actions are taken by a Trustee 202 in relation to a trade date for a given trade in accordance with on example embodiment of the systems and methods described herein. Thus, as can be seen, the day before the trade (Trade date−1), Trustee 202 can execute previous creation and/or redemption orders and set up an account in a clearing system. The clearing system can be the internal system used by Trustee 202 to clear transactions. On the same day, Trustee 202 can update the Net Asset Value (NAV) of trust 115 based on the executed creation and/or redemption orders.

On the trade date, Trustee 202 can receive new creation and/or redemption orders from a participant 204. In one embodiment, all such orders are received before 1:30 pm eastern time, or before the close of the gold market. Trustee 202 can then price the new creation and/or redemption orders based on the NAV determined from the previous day. Trustee 202 can then book the new creation and/or redemption orders and cause the outstanding shares 130 to be correspondingly increased. Trustee 202 can then send a pending delivery notice to a Custodian 206, as described above. The pending delivery notice should include, e.g., the number of ounces of gold to be delivered. Trustee 202 can then receive a confirmation form the Custodian.

Figure 10:
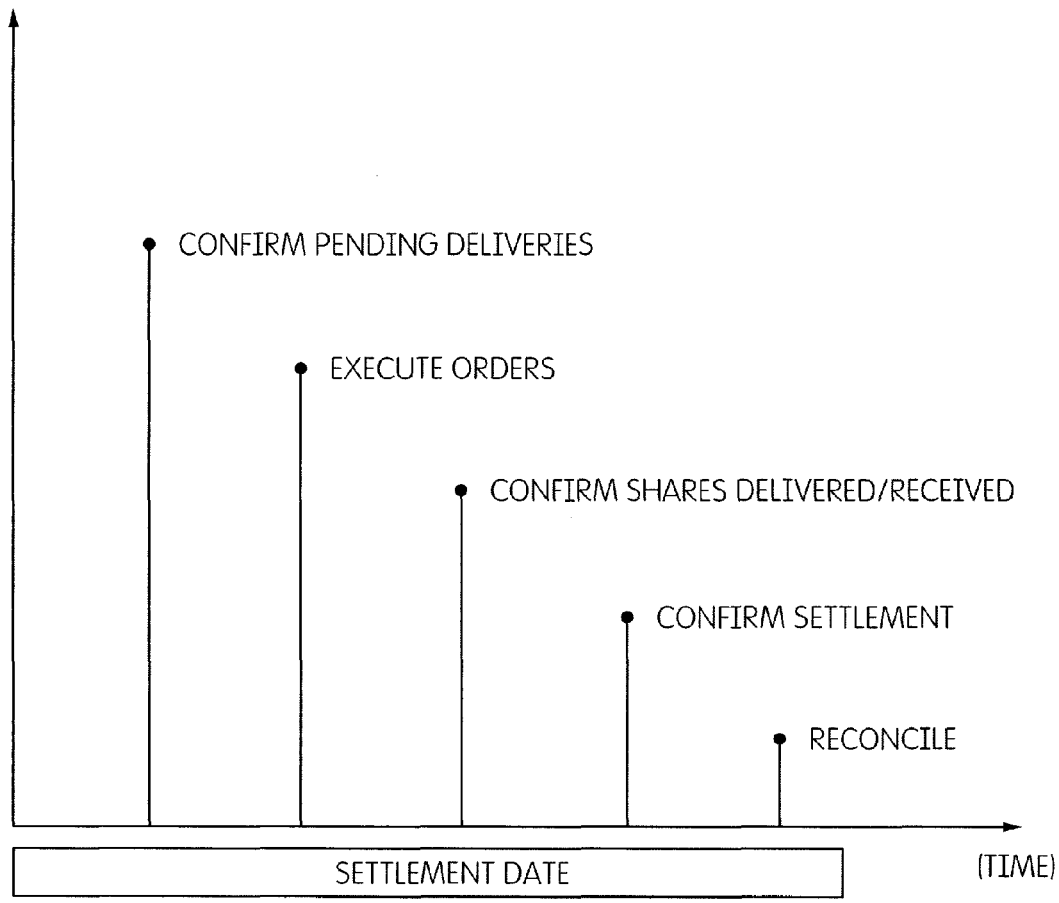
FIG. 10 is a time line illustrating the steps performed by a Trustee on a settlement date with respect to a creation or redemption transaction in accordance with one embodiment.

FIG. 10 is a timeline illustrating the action that can be taken by Trustee 20 on a settlement date for a given transaction in accordance with one example embodiment of the systems and methods described herein. Thus, on the settlement date, Trustee 202 can confirm all pending deliveries to or form Custodian 206. Trustee 202 can then cause the execution of all pending deliveries. For example, all pending deliveries can be executed on the trade date plus one day (trade date+1). In certain embodiments, execution on the day after the trade date can require that the creation and/or redemption orders are received before a certain cut-off time on the trade date. Trustee 202 can then receive confirmation that the requisite gold was delivered to or from Custodian 206. The confirmation can include a detailed inventory of the gold units 120 delivered.

The shares 130 created can be delivered from or to DTC 208 and Trustee 202 can confirm the settlement of all share transactions. All gold and gold receipt positions can then be reconciled for the day.

In certain embodiments the NAV, mentioned above, for trust 115 can be determined by Trustee 202 at the close of trading on the New York Stock Exchange (NYSE) on each business day. The NAV can represent the aggregate value of the assets of trust 115 less its liabilities, which include accrued expenses briefly mentioned and described above. In determining NAV, Trustee 202 can, depending on the embodiment, value gold units 120 held in trust 115 based on the price of an ounce of gold as fixed by the existing five fixing members of the London Bullion Market Association (LBMA), e.g., at 3:00 PM London, England time (London PM Fix). Trustee 202 can also determine the NAV per Share.

The ordinary operating expenses associated with trust 115 can be accrued daily and can be reflected in the NAV of trust 115. In order to pay the Trust's expenses, Trustee 202 can sell gold 120 held by in trust 115 on an as needed basis. Expenses can include fees and expenses of Trustee 202, expenses associated with custody of gold 120, printing and mailing costs, legal and audit fees, Securities and Exchange Commission (SEC) registration fees, and NYSE listing fees, i.e., fees associated with listing shares 130 on a secondary market in order to make them available to investors 210.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method for electronically trading shares of physical gold bars over an electronic communications network (ECN), the method comprising:
   providing an amount of the physical gold bars to a trust, the physical gold bars provided to the trust having a value based at least on a weight thereof;
   receiving a number of trust shares each representing a proportional ownership interest in the physical gold bars; and
   using the electronic communication network (ECN) to trade one or more of the trust shares,
   wherein said using the ECN to trade one or more of the trust shares facilitates purchase or sale of the trust shares by an investor and provides liquidity with respect to the trading of the physical gold bars.

2. The method of claim 1, wherein, after using the ECN to trade said one or more of the trust shares over the ECN, a buyer thereof owns a corresponding interest in a portion of the physical gold bars, said portion of the gold bars being stored in a repository associated with the trust account.

3. The method of claim 1, wherein, after using the ECN to trade said one or more of the trust shares over the ECN, a buyer thereof owns a corresponding interest in a portion of the physical gold bars, said portion of the gold bars being physically transferred out of a repository associated with the trust account.

4. The method of claim 1, wherein said using the ECN to trade one or more of the trust shares over the ECN comprises trading via a securities exchange so as to create a secondary market for the trust shares.

5. A method for electronically trading shares of physical gold bars over an electronic communications network (ECN), the method comprising:
provalid an amount of the physical gold bars to a trust, the physical gold bars provided to the trust having a value based at least on a weight thereof;
receiving a number of trust shares each representing a proportional ownership interest in the physical gold bars; and
using the electronic communication network (ECN) to trade one or more of the trust shares,
wherein said using the ECN to trade one or more of the trust shares over the ECN comprises trading via a securities exchange so as to create a secondary market for the trust shares,
wherein the securities exchange is the New York Stock Exchange, and
wherein said trading one or more of the trust shares via the securities exchange facilitates purchase or sale of trust shares by an investor and provides liquidity with respect to the trading of the physical gold bars.

6. The method of claim 1, further comprising establishing the value of the physical gold bars by use of an assay result of the gold bars in addition to the weight.

7. The method of claim 1, further comprising maintaining the trust for the benefit of one or more trust share owners by a trustee.

8. The method of claim 1, further comprising, establishing a creation order that requests creation of the trust shares.

9. The method of claim 8, wherein said creation order requests creation of a minimum amount of the trust shares or a multiple of the minimum amount.

10. The method of claim 8, wherein said creation order requests creation of a specific number of trust shares.

11. The method of claim 8, wherein said creation order requests creation of a number of trust shares that correspond to a specified amount of the physical commodity.

12. The method of claim 1, comprising:
providing a redemption order comprising a request to redeem one or more trust shares corresponding to an associated physical amount of the delivered gold bars.

13. The method of claim 12, further comprising obtaining a receipt for the transferred physical amount.

14. The method of claim 1, further comprising creating additional trust shares responsive to a delivery of an additional physical amount of gold bars to the trust.

15. A method for electronically trading shares of physical gold bars over an electronic communications network (ECN), comprising:
receiving an amount of physical gold bars in a trust, the physical gold bars received having a value based at least on a weight thereof;
creating trust shares, each share representing a proportional ownership interest in the physical gold bars in the trust;
enabling trading of the trust shares over the electronic communications network,
wherein said enabling trading of the trust shares over the ECN facilitates purchase or sale of the trust shares by an investor and provides liquidity with respect to the trading of the physical gold bars.

16. The method according to claim 15, further comprising weighing of the physical gold bars prior to receiving the physical gold bars in the trust to determine a value thereof.

17. The method of claim 1, wherein the trust shares are traded over the ECN as an exchange-traded security.

18. The method of claim 5, wherein said one or more of the trust shares are traded on the securities exchange as an exchange-traded security.

19. The method of claim 15, wherein said enabling trading of the trust shares over the ECN comprises enabling trading of the trust shares as an exchange-traded security.

* * * * *